UNITED STATES PATENT OFFICE.

JOHN T. WENYON, OF HARRISBURG, PENNSYLVANIA.

METHOD OF CONVERTING SCRAP METAL INTO MERCHANT BARS.

1,399,679.     Specification of Letters Patent.     Patented Dec. 6, 1921.

No Drawing.     Application filed February 14, 1921. Serial No. 445,017.

*To all whom it may concern:*

Be it known that I, JOHN T. WENYON, a subject of the King of England, residing at Harrisburg, in the county of Dauphin and State of Pennsylvania, have invented certain new and useful Improvements in Methods of Converting Scrap Metal into Merchant Bars, of which the following is a specification.

The object of the invention is to provide economical improvements in the carrying out or manipulation of the manufacturing process of box piling and of wrought iron and steel scrap by amalgamating therewith sufficient molten metal, of any suitable ingredient to procure a perfectly homogeneous weld of the scrap material.

My invention relates to the treatment and method of the reworking of wrought iron and steel scrap of miscellaneous character, and has for its further object to provide a method of amalgamating any suitable ingredients of new molten metal, of iron or steel with the scrap to materially improve the quality and to secure a perfectly homogeneous weld and to reduce the cost thereof.

In the manufacture of iron or steel bars, strips, or plates, it is universally conceded to be practically impossible to produce satisfactory finished bars, strip, or plates, direct from the scrap material alone, and therefore some new material such as puddled iron or steel must be added to insure a homogeneous weld and to improve the quality of the impoverished scrap material.

The purpose of my invention therefore is to minimize the cost of manipulating the box piling process in the manufacture of bars, strip or plates by dispensing with considerable skilled labor, required in the puddling process, and thereby to expedite the tonnage at considerably less cost.

Heretofore fagots, bundles and piles of scrap have been immersed by me in a bath of molten iron silicate slag in a furnace to obtain a homogeneous weld, but this necessitates the scrap being well tied up in such a manner as to insure the fagot, bundle or pile holding together.

My improved method or process, however, applies particularly to the art of reworking miscellaneous scrap material of iron or steel, in which method I do not have to bundle, pile, or tie the scrap together, but can use scrap of any shape or form in its loose conditions small or large up to a given size, and thereby save the cost of making the heretofore necessary fagots, bundles or piles, and therefore purpose to use molds similar to the ordinary ingot molds used at the open hearth of any steel works, and instead of piling and tying together, I purpose to fill the metal molds with the loose scrap material, and then to run in, over the scrap cuttings, a mixture of molten metal, either over the cold scrap, or the scrap may be preheated in any suitable furnace. This operation will expedite matters and can be accomplished with unskilled labor. When the molten metal has solidified, the molds will be removed, and the resulting ingot, or bloom, may be charged in a heating furnace, reheated and rolled or hammered into bars, strip, or plates as required. Or, on the other hand, the ingot, or bloom, may be first treated in a suitable furnace to reduce the carbon if desired, and thereafter rolled or hammered as usual.

The molten metal, I purpose using, can be produced in any suitable furnace, open hearth, or cupola, as may be desired, and the quality of said molten metal can be varied as occasion demands.

The advantages of my invention are, that no skilled labor will be required, and no fagots, bundles, or piles, to be made or tied, and the filling of the molds will be far more expeditious with less labor, and the amalgamation of the molten metal can be produced at little cost and almost of any quality desired, thus nourishing the impoverished scrap material which must be most advantageous in the production of the finished material after rolling, and resulting in a perfectly homogeneous weld.

I do not limit myself to any particular size of the molds, as the same process or method may be worked advantageously at steel plants, when specified analyses are not required.

Having thus described my invention, what I claim and desire to protect by Letters Patent of the United States is:—

1. The process or method of producing a compact integral mass of iron or steel material in the form of an ingot, bloom, fagot, bundle, or pile, from miscellaneous particles of iron or steel scrap, which consists in assembling miscellaneous particles of iron or steel scrap in a mold, then pouring over the said scrap within the mold a new substantially slagless molten refined mass of iron or steel, to unite the particles of scrap to form a compact unit such as an ingot, bloom, fagot, bundle, or pile.

2. The process or method of the amalgamation of sections, or particles of miscellaneous iron or steel scrap with a molten refined mass of iron or steel metal added thereto, to form an integral ingot, bloom, fagot, bundle, or pile, which consists in assembling miscellaneous particles of iron or steel scrap in a mold, then pouring over said scrap within the said mold a new molten, refined, substantially slagless, mass of iron or steel, to form or make a practical unit adapted for a continuous heating furnace.

3. The process or method of amalgamating a new molten refined metal of iron or steel, with particles of iron or steel scrap for the purpose of nourishing the impoverished portion of scrap material to produce a sound ductile quality of finished products, which consists in assembling miscellaneous particles of iron or steel scrap in a mold, then pouring over said scrap within said mold a new molten refined substantially slagless mass of iron or steel, filling all the interstices within the mold to form a compact integral mass of material.

4. The process or method to secure a perfect homogeneous weld of iron or steel scrap, fagot, bundle, or pile, adapted for reheating and hammering or rolling into bars, strip, or plates, which consists in assembling within or filling a mold with miscellaneous particles of iron or steel scrap, then pouring over said scrap within the mold a new molten refined substantially slagless mass of iron or steel, to bind the said scrap material in a compact integral mass or unit of suitable form.

5. The herein described method of producing a homogeneous mass of iron or steel, which consists in forming an ingot, bloom, fagot, bundle or pile, by introducing particles of iron or steel scrap into a mold, heating such particles then pouring over said particles within the mold while in the heated condition a new molten refined mass of iron or steel, to unite with the particles of scrap to form a compact unit, allowing the unit to solidify and removing the same from the mold, reheating the unit, and mechanically working the unit to produce the desired finished product which is homogeneous throughout.

6. The herein described method of producing a homogeneous mass of iron or steel, which consists in forming an ingot, bloom, fagot, bundle or pile, by introducing particles of iron or steel scrap into a mold, then pouring over said particles within the mold and while the particles are in a heated condition a new molten refined mass of metal which is similar to the metal of the scrap already within the mold, to unite the particles of scrap to form a unit, allowing the unit to solidify and removing the same from the mold, reheating the unit, and mechanically working the unit to produce the desired finished product which is homogeneous throughout.

In testimony whereof I have affixed my signature.

JOHN T. WENYON.